United States Patent [19]

Sadler et al.

[11] Patent Number: 4,742,093

[45] Date of Patent: May 3, 1988

[54] NON-PERMANENT ORNAMENTAL PAINT MIXTURE

[75] Inventors: Wanda H. Sadler, Dallas; John Milligan, Bexar County; Jerry W. Parks, Dallas, all of Tex.

[73] Assignee: Pep Rally Paint, Inc., Dallas, Tex.

[21] Appl. No.: 937,094

[22] Filed: Dec. 2, 1986

Related U.S. Application Data

[63] Continuation-in-part of Ser. No. 725,766, Apr. 22, 1985, Pat. No. 4,626,559.

[51] Int. Cl.$^4$ .......................... C08K 3/20; C08J 3/20; C09D 5/02; C09D 5/28
[52] U.S. Cl. .................................. 523/122; 523/334; 523/501; 524/501; 427/154; 427/155; 427/156
[58] Field of Search ............... 523/122, 334; 524/501; 427/154–156

[56] References Cited

U.S. PATENT DOCUMENTS

| | | | |
|---|---|---|---|
| 4,041,200 | 8/1977 | Boranian et al. | 428/40 |
| 4,420,575 | 12/1983 | Rapaport et al. | 524/903 |
| 4,427,811 | 1/1984 | Elias et al. | 524/493 |
| 4,554,018 | 11/1985 | Allen | 524/457 |
| 4,626,559 | 12/1986 | Sadler et al. | 523/122 |
| 4,636,548 | 1/1987 | Kossmann et al. | 524/524 |

*Primary Examiner*—Herbert J. Lilling
*Attorney, Agent, or Firm*—Harry C. Post, III

[57] ABSTRACT

A non-permanent ornamental paint mixture being water soluble after drying. The mixture consists essentially of: from about 75.0 to about 85.0 parts by weight water; from about 10.0 to about 12.0 parts by weight filler; from about 0.5 to about 1.5 parts by weight aqueous pigment dispersion; from about 2.0 to about 2.5 parts by weight release agent; from about 3.0 to about 4.5 parts by weight acid containing, cross-linked acrylic emulsion copolymer; up to 1.0 parts by weight alkali; up to 0.1 parts by weight defoamer; and up to 0.1 parts by weight antimicrobial agent.

14 Claims, No Drawings

NON-PERMANENT ORNAMENTAL PAINT MIXTURE

This application is a continuation-in-part of application Ser. No. 06/725,766, filed on Apr. 22, 1985, now U.S. Pat. No. 4,626,559, and entitled: Non-permanent Ornamental Paint Mixture.

Athletic sponsors and boosters frequently decorate their cars, trucks and similar vehicles to indicate their support of their chosen team. Generally this decoration includes slogans and statements written on the vehicle's exterior with paint or shoe polish. The application of the paint or shoe polish to the vehicle's exterior paint injures the paint through discoloration or dying. Thus, requiring the vehicle to be refinished which is wasteful and costly.

Accordingly, it is an object of the present invention to provide a non-permanent ornamental paint mixture.

Further, it is an object of the present invention to provide a non-permanent ornamental paint mixture that is water soluble after drying.

Further, it is an object of the present invention to provide a non-permanent ornamental paint mixture that will not damage a vehicle's exterior finish after drying.

In accordance with the invention, a non-permanent ornamental paint mixture is provided that is water soluble after drying and will not damage a vehicle's exterior finish after drying. The paint mixture consists essentially of: from about 75.0 to about 85.0 parts by weight water; from about 10.0 to about 12.0 parts by weight filler; from about 0.5 to about 1.5 parts by weight aqueous pigment dispersion; from about 2.0 to about 2.5 parts by weight release agent; from about 3.0 to about 4.5 parts by weight acid containing, acrylic emulsion copolymer; up to 1.0 parts by weight alkali; up to 0.1 parts by weight defoamer; and up to 0.1 parts by weight antimicrobial agent.

Any conventional material well known in the art may be used as the filler to carry pigment in the paint mixture. One filler, disclosed in application Ser. No. 06/725,766, is selected from the group consisting of calicum carbonate, such as that sold under the trade name Snowflake, and magnesium silicate with the filler being a mixture of magnesium silicate and calicum carbonate in a weight ratio of between 5:95 and 15:85. However, the preferred filler in this application is a complex hydrous calcium magnesium silicate, such as the filler sold by Cron Chemical Corporation under the trade name Nytal 200. This filler is 20–40 percent talc (hydrated magnesium silicate), 1–5 percent talc (fibrous), 30–50 percent tremolite nonasbestiform, 5–10 percent anthophyllite nonasbestiform, 20–30 percent serpentine (antiqorite - lizardite), and 0–2 percent quartz.

Any conventional material, organic and inorganic, well known in the art may be used as the coloring agent or pigment. However, the preferred coloring agent is a polymeric aqueous pigment dispersion having high pigment content, complete dispersion, non-settling, low surfactant level and free flowing, such as those sold by the Dispersions Division of the Sun Chemical Corporation under the trade name Aqua Tone. These pigment dispersions have a pH range of from 7.5 to 8.5 and at least 25% by weight pigment.

The release agent provided in the invention assists in preventing the dried pigment from adhering to the vehicles exterior finish with sufficient strength to prevent removal or damage to the finish. The preferred release agent is a straight chain silicone emulsion polymer sold by Dow Chemical Company under the trade name Dow Silicone #346, which allows the dried paint mixture of the present invention to be removed from the vehicle's finish without discoloration or drying by application of water and slight wiping.

An alkali swellable inhibiting agent is used to inhibit the removal of the pigment after drying by wiping. It is preferred that this agent is an acid containing, acrylic emulsion copolymer. An example of one such copolymer and the most preferred copolymer is sold as a thickening agent by Rohm and Haas Company under the trade name Acrysol TT-615. This preferred copolymer has approximately 30.0 percent solids, approximately 3.0 pH, a viscosity of 20 cps, a density of 8.75 pounds/U.S. gallon at 25° C. specific gravity, and an anionic charge.

The alkali is provided in the invention to cause the acid containing, acrylic emulsion copolymer to swell. The preferred alkali is ammonium hydroxide.

Any conventional material well known in the art may be used as the defoamer to prevent the entrainment of air during mixing in the paint mixture. However, the preferred defoamer is a non-silicone polymer sold under the trade name B.Y.K. 035.

Any conventional material well known in the art may be used as the antimicrobial agent to inhibit the growth of bacteria in the paint mixture. However, the preferred antimicrobial agent is a white powder having approximately 67.5 percent an active ingredient of 1-(3-chloroallyl)-3,5,7-triaza-1-azoniaadamantane chloride and approximately 32.5 percent inert ingredients, including a minimum of 23.0 percent sodium bicarbonate, and is sold by Dow Corning Company under the trade-name Dowicil.

The following examples are presented to illustrate the practice of the invention and not as an indication of the limits or scope thereof.

EXAMPLE I

A violet colored non-permanent ornamental paint mixture was made by preparing a homogenous base solution, simultaneously mixing the inhibiting agent and alkali into the base solution and then mixing the aqueous pigment dispersion into the solution. The base solution is prepared by mixing into 325.34 pounds of water 0.36 pounds of non-silicone polymer defoamer (B.Y.K. 035), followed by 45.26 pounds of a complex hydrous calcium magnesium silicate filler (Nytal 200), followed by 0.007 pounds antimicrobial agent (Dowicil), and followed by 8.82 pounds of a straight chain silicone emulsion polymer (Dow Silicone #346). After homogenization of the base solution, 15.69 pounds an acid containing, acrylic emulsion copolymer (Acrysol TT-615) and 3.93 pounds of ammonium hydroxide are simultaneously mixed into the base solution. After homogenization of this intermediate solution, 3.53 pounds of an aqueous pigment is mixed into the solution. The aqueous pigment dispersion is a carbazole violet pigment type, is 25% by weight pigment, has a pH range of 7.5–8.5, has a 1.02 specific gravity and is sold by Sun Chemical Corporation under Color Index Name Violet 23, Color Index No. 51319. The paint mixture was then applied to a sample of a vehicle's external finish and allowed to dry for at least 12 hours. Free flowing water was directed against the dried paint mixture and with light wiping the non-permanent ornamental paint mixture of the present invention was removed without damage to the finish.

EXAMPLE II

A blue colored novel non-permanent ornamental paint mixture was made by preparing a homogeneous base solution, simultaneously mixing the inhibiting agent and alkali into the base solution and then mixing the aqueous pigment dispersion into the solution. The base solution is prepared by mixing into 324.41 pounds of water 0.35 pounds of non-silicone polymer defoamer (B.Y.K. 035), followed by 46.14 pounds of a complex hydrous calcium magnesium silicate filler (Nytal 200), followed by 0.007 pounds antimicrobial agent (Dowicil), and followed by 8.82 pounds of a straight chain silicone emulsion polymer (Dow Silicone #346). After homogenization of the base solution, 15.68 pounds an acid containing, acrylic emulsion copolymer (Acrysol TT-615) and 3.93 pounds of ammonium hydroxide are simultaneously mixed into the base solution. After homogenization of this intermediate solution, 3.53 pounds of an aqueous pigment dispersion is mixed into the solution. The aqueous pigment dispersion is a phthalocyanine blue pigment type, which is 45% by weight pigment, has a pH range of 7.5–8.5, a 1.23 specific gravity and is sold by Sun Chemical Corporation under Color Index Name Blue 15, Color Index No. 74160. The paint mixture was then applied to a sample of a vehicle's external finish and allowed to dry for at least 12 hours. Free flowing water was directed against the dried paint mixture and with light wiping the non-permanent ornamental paint mixture of the present invention was removed without damage to the finish.

EXAMPLE III

A green colored non-permanent ornamental paint mixture was made by preparing a homogeneous base solution, followed by simultaneously mixing an inhibiting agent and alkali into the base solution and then mixing the aqueous pigment dispersion into the solution. The base solution is prepared by mixing into 323.57 pounds of water 0.36 pounds of non-silicone polymer defoamer (B.Y.K. 035), followed by 45.26 pounds of a complex hydrous calcium magnesium silicate filler (Nytal 200), followed by 0.007 pounds antimicrobial agent (Dowicil), and followed by 8.82 pounds of a straight chain silicone emulsion polymer (Dow Silicone #346). After homogenization of the base solution, 15.96 pounds an acid containing, acrylic emulsion copolymer (Acrysol TT-615) and 3.93 pounds of ammonium hydroxide are simultaneously mixed into the base solution. After homogenization of this intermediate solution, 3.53 pounds of an aqueous pigment dispersion is mixed into the solution. The aqueous pigment dispersion is a phthalocyanine green pigment type, which is 45 % by weight pigment, has a pH range of 7.5–8.5, a 1.31 specific gravity and is sold by Sun Chemical Corporation under Color Index Name Green 7, Color Index No. 74260. The paint mixture was then applied to a sample of a vehicle's external finish and allowed to dry for at least 12 hours. Free flowing water was directed against the dried paint mixture and with light wiping the non-permanent ornamental paint mixture of the present invention was removed without damage to the finish.

EXAMPLE IV

An orange colored non-permanent ornamental paint mixture was made by preparing a homogenous base solution, followed by simultaneously mixing an inhibiting agent and alkali into the base solution and then mixing the aqueous pigment dispersion into the solution. The base solution is prepared by mixing into 325.24 pounds of water 0.36 pounds of non-silicone polymer defoamer (B.Y.K. 035), followed by 45.06 pounds of a complex hydrous calcium magnesium silicate filler (Nytal 200), followed by 0.007 pounds antimicrobial agent (Dowicil), and followed by 8.82 pounds of a straight chain silicone emulsion polymer (Dow Silicone #346). After homogenization of the base solution, 15.96 pounds an acid containing, acrylic emulsion copolymer (Acrysol TT-615) and 3.91 pounds of ammonium hydroxide are simultaneously mixed into the base solution. After homogenization of this intermediate solution, 3.53 pounds of an aqueous pigment dispersion is mixed into the solution. The aqueous pigment dispersion is a dinitroaniline orange pigment type, is 40% by weight pigment, has a pH range of 7.5–8.5 and a 1.17 specific gravity and is sold by Sun Chemical Corporation under Color Index Name Orange 5, Color Index No. 12075. The paint mixture was then applied to a sample of a vehicle's external finish and allowed to dry for at least 12 hours. Free flowing water was directed against the dried paint mixture and with light wiping the non-permanent ornamental paint mixture of the present invention was removed without damage to the finish.

EXAMPLE V

A yellow-gold colored non-permanent ornamental paint mixture was made by preparing a homogenous base solution, followed by simultaneously mixing an inhibiting agent and alkali into the base solution and then mixing the aqueous pigment dispersion into the solution. The base solution is prepared by mixing into 339.10 pounds of water 0.35 pounds of non-silicone polymer defoamer (B.Y.K. 035), followed by 46.15 pounds of a complex hydrous calcium magnesium silicate filler (Nytal 200), followed by 0.007 pounds antimicrobial agent (Dowicil), and followed by 8.82 pounds of a straight chain silicone emulsion polymer (Dow Silicone #346). After homogenization of the base solution, 15.69 pounds an acid containing, acrylic emulsion copolymer (Acrysol TT-615) and 3.91 pounds of ammonium hydroxide are simultaneously mixed into the base solution. After homogenization of this intermediate solution, 5.29 pounds of an aqueous pigment dispersion is mixed into the solution. The aqueous pigment dispersion is a diarylide yellow pigment type, is 40% by weight pigment, has a pH range of 7.5–8.5 and a 1.16 specific gravity and is sold by Sun Chemical Corporation under Color Index Name Yellow 14, Color Index No. 21095. The paint mixture was then applied to a sample of a vehicle's external finish and allowed to dry for at least 12 hours. Free flowing water was directed against the dried paint mixture and with light wiping the non-permanent ornamental paint mixture of the present invention was removed without damage to the finish.

The invention having been described, what is claimed is:

1. A non-permanent ornamental paint mixture being water soluble after drying, consisting essentially of: from about 75.0 to about 85.0 parts by weight water; from about 10.0 to about 12.0 parts by weight filler; from about 0.5 to about 1.5 parts by weight aqueous pigment dispersion; from about 2.0 to about 2.5 parts by weight release agent; from about 3.0 to about 4.5 parts by weight of an acid containing, acrylic emulsion copolymer; up to 1.0 parts by weight alkali; up to 0.1 parts by weight defoamer; and up to 0.1 parts by weight antimicrobial agent.

2. A paint mixture as set forth in claim 1, further consisting essentially of from about 77.0 to about 82.0 parts by weight water.

3. A paint mixture as set forth in claim 1, further consisting essentially of from about 10.5 to about 11.5 parts by weight filler.

4. A paint mixture as set forth in claim 1, further consisting essentially from about 0.8 to about 1.3 parts by weight pigment dispersion.

5. A paint mixture as set forth in claim 1, further consisting essentially from about 2.0 to about 2.2 parts by weight release agent.

6. A paint mixture as set forth in claim 1, further consisting essentially from about 3.5 to about 4.0 parts by weight acid containing, acrylic emulsion copolymer.

7. A paint mixture as set forth in claim 1, further consisting essentially from about 0.9 to about 1.0 parts by weight alkali.

8. A paint mixture as set forth in claim 1, further consisting essentially of from about 77.0 to about 82.0 parts by weight water; of from about 10.5 to about 11.5 parts by weight filler; of from about 0.8 to about 1.3 parts by weight pigment dispersion; of from about 2.0 to about 2.2 parts by weight release agent; of from about 3.5 to about 4.0 parts by weight acid containing, acrylic emulsion copolymer; and of from about 0.9 to about 1.0 parts by weight alkali.

9. A paint mixture as set forth in claim 1, wherein said antimicrobial agent includes an active ingredient of 1-(3-chloroallyl)-3,5,7-triaza-1-azoniaadamantane chloride.

10. A paint mixture as set forth in claim 1, wherein said release agent includes a straight chain silicone emulsion polymer.

11. A paint mixture as set forth in claim 1, wherein said alkali includes ammonium hydroxide.

12. A paint mixture as set forth in claim 1, wherein said filler includes a complex calcium magnesium silicate.

13. A paint mixture as set forth in claim 1, wherein said antimicrobial agent includes an active ingredient of 1-(3-chloroallyl)-3,5,7-triaza-1-azoniaadamantane chloride; said release agent includes a straight chain silicone emulsion polymer; said alkali includes ammonium hydroxide; and said filler includes a complex calcium magnesium silicate.

14. A non-permanent ornamental paint mixture being water soluble after drying, consisting essentially of: from about 77.0 to about 82.0 parts by weight water; from about 10.5 to about 11.5 parts by weight filler, said filler including a complex calcium magnesium silicate; from about 0.8 to about 1.3 parts by weight pigment dispersion; from about 2.0 to about 2.2 parts by weight release agent, said release agent including a straight chain silicone emulsion polymer; from about 3.5 to about 4.0 parts by weight acid containing, acrylic emulsion copolymer; and from about 0.9 to about 1.0 parts by weight alkali, said alkali including ammonium hydroxide; up to 0.1 parts by weight defoamer; and up to 0.1 parts by weight antimicrobial agent, said antimicrobial agent including an active ingredient of 1-(3-chloroallyl)-3,5,7-triaza-1-azoniaadamantane chloride.

* * * * *